April 18, 1967  YOSHIO NITTA ET AL  3,315,169
APPARATUS FOR DETECTING A SIGNAL ADVANCED BY A
PREDETERMINED TIME INTERVAL RELATIVE TO A ZERO
POINT OF AN ALTERNATING ELECTRIC CURRENT
Filed Nov. 19, 1964                                       4 Sheets-Sheet 1

FIG. 1

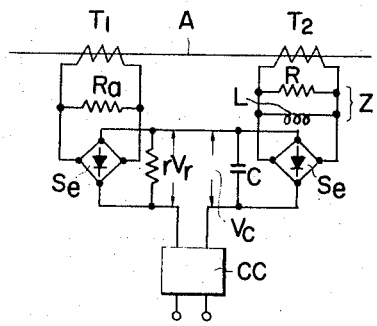

FIG. 2

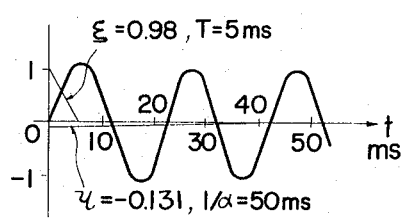

FIG. 3

SECONDARY CURRENT OF
CURRENT TRANSFORMER
(TERMINAL VOLTAGE OF
RESISTOR $R_a$)

TERMINAL VOLTAGE OF
IMPEDANCE CONSISTING
OF RESISTOR R AND
INDUCTOR L

TERMINAL VOLTAGE OF
RESISTOR r

TERMINAL VOLTAGE OF
CAPACITOR C

OUTPUT PULSE OF
COMPARISON CIRCUIT

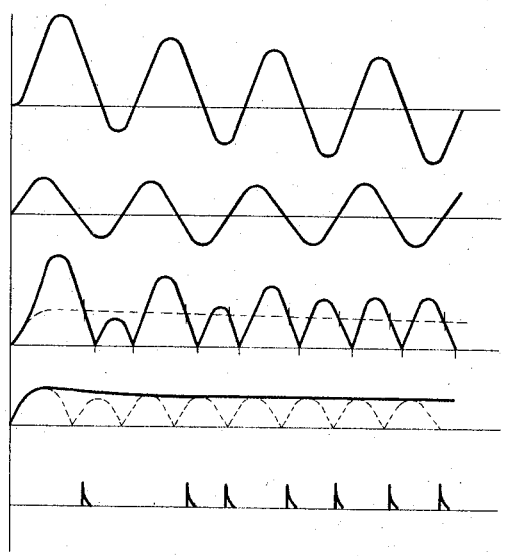

FIG. 4

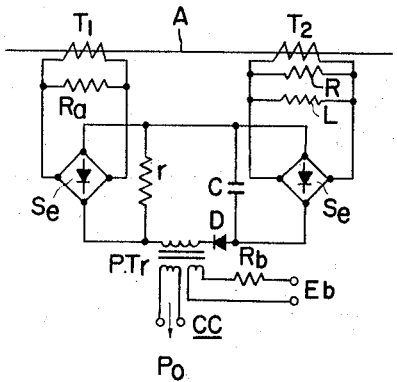

SECONDARY CURRENT OF
CURRENT TRANSFORMER
( TERMINAL VOLTAGE OF
RESISTOR Ra )

TERMINAL VOLTAGE OF
RESISTOR r

TERMINAL VOLTAGE OF
IMPEDANCE CONSISTING
OF RESISTOR R AND
INDUCTOR L

TERMINAL VOLTAGE OF
CAPACITOR C

OUTPUT PULSE OF
PULSE TRANSFORMER

DETECTING
LEVEL $V_c - V_r$

OUTPUT
PULSE

United States Patent Office 3,315,169
Patented Apr. 18, 1967

3,315,169
APPARATUS FOR DETECTING A SIGNAL ADVANCED BY A PREDETERMINED TIME INTERVAL RELATIVE TO A ZERO POINT OF AN ALTERNATING ELECTRIC CURRENT
Yoshio Nitta, Sumida-ku, Tokyo-to, Takeshi Takemura, Toshima-ku, Tokyo-to, and Kikuo Kawasaki Ota-ku, Japan, assignors to Fuji Denki Seizo Kabushiki Kaisha, Kawasaki-shi, Japan, a joint-stock company of Japan
Filed Nov. 19, 1964, Ser. No. 412,561
9 Claims. (Cl. 328—150)

The present invention relates to an apparatus for detecting a signal advanced by a predetermined time interval relative to a zero point of an alternating electric current, said signal being adapted to be used as a breaking command for synchronous breaking of an electric circuit breaker such as, for example, a high speed circuit breaker.

In the conventional electric circuit breaker, electrodes are opened by a breaking command without relation to the phase of the current to be broken, and the circuit breaking is completed at the time when the current becomes zero after elapse of an arc period of from a half cycle to several cycles.

In the recently developed high speed circuit breaker of the type in which electrode opening speed is extremely high, the most appropriate circuit breaking can be always attained by synchronizing the breaking command with a zero point of the circuit current to be broken, whereby the functional load on the circuit breaker becomes remarkably light.

The primary object of the present invention is to provide an apparatus which can detect a signal occurring a predetermined time interval before a zero point of the alternating electric current so that a breaking command adapted to the aforementioned synchronized breaking can be positively obtained.

Another object of the present invention is to provide an apparatus capable of attaining synchronized breaking by affording a breaking command in synchronism with a zero point of an alternating electric current to be broken even when said current contains a transient direct-current component.

Said primary object of this invention has been principally attained by utilizing a proportional bias system, in which a direct current bias which is in proportion to the magnitude of the alternating component in the main current passing through the main circuit to be broken is compared with a comparing voltage similar to said main current, and the cross point of said bias and comparing voltage is detected, thus making possible production of a synchronous breaking command, that is, a signal which is advanced by a predetermined time interval relative to a zero point of said main current.

Said other object of this invention has been attained by a system in which a direct current voltage which is in proportion to the amplitude of the alternating current component in the main circuit and which has a magnitude adapted to obtain a desired lead angle is utilized as a bias and this bias is compared with the wave form of the original current to obtain a command pulse at the instant when said bias and the original current become equal to each other, whereby a predetermined time interval before a zero point of the main current passing through the main circuit to be broken is caused to be detected without relation to the existence of a direct current component. This system is based on the fact that the gradient of a sinusoidal alternating current can be considered to be constant over a relatively wide range before and after a zero point of said main current.

With these and other objects in view the invention resides in the construction, combination and arrangement of parts as will be hereinafter more fully described, illustrated in the accompanying drawings, and pointed out in the claims hereunto appended. In the drawings, in which the same or equivalent members are designated by like reference characters:

FIG. 1 is a basic connection diagram of the present invention;

FIGS. 2 and 3 are waveforms for describing the principle of the present invention;

FIGS. 4 to 7 are respectively connection diagrams of different examples according to the present invention;

Figure 10:
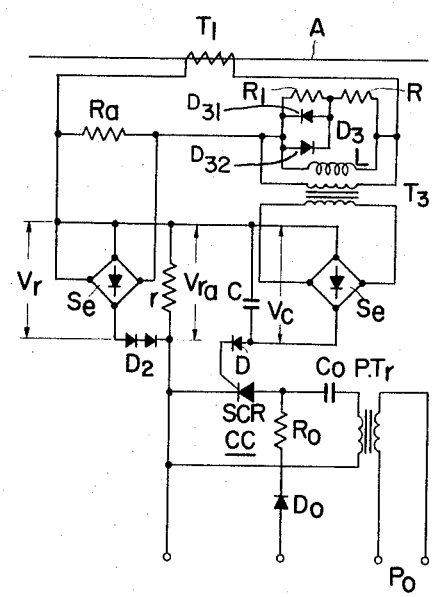
Figure 11:
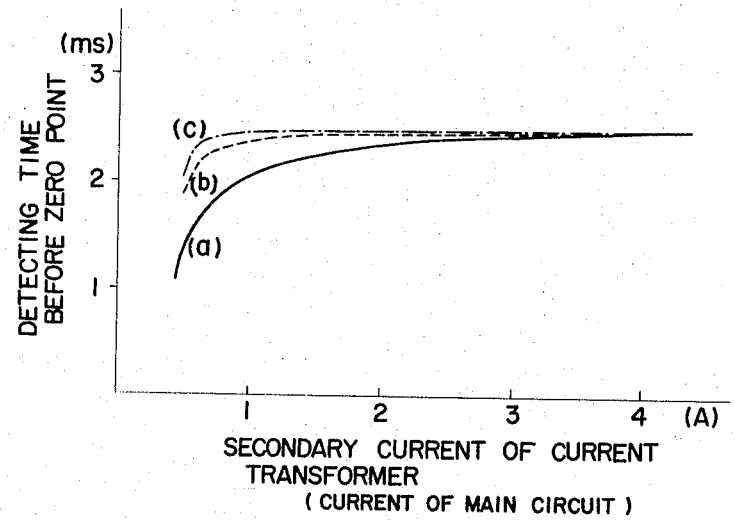
Figure 12:
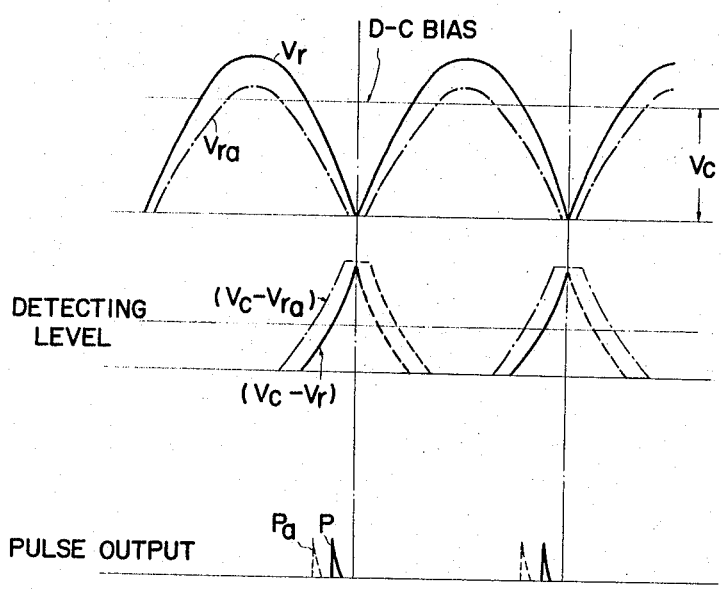

FIGS. 8 and 9(A), 9(B) and 9(C) show waveforms for describing the operation of the examples of FIGS. 4 to 7;

FIG. 10 is connection diagram of a further example of the present invention;

FIG. 11 represents the relation between the magnitude of the main current and the detecting time prior to zero point; and FIG. 12 shows waveforms for describing the operation of the example of FIG. 10.

Referring to FIG. 1, from each of the secondary coils of two current transformers $T_1$ and $T_2$ connected to a main circuit A, there is taken out a secondary current which is in proportion to the main current of the main circuit A. Since the secondary current of the current transformer $T_1$ passes through a load resistor $R_a$, the waveform of the terminal voltage of said resistor $R_a$ is entirely equal to that of the current of the main circuit. On the other hand, since the secondary current of the current transformer $T_2$ passes through an alternating current component detecting load circuit Z consisting of a resistor R and an inductor L which are connected in parallel, the phase of the terminal voltage of said detecting load circuit Z leads the phase of the current of the main circuit A, but said voltage consists substantially of the alternating component of the current of the main circuit A, as will clearly be understood from the following calculation.

On the assumption that $\tau$ represents a detecting time prior to a zero point of the current in the main circuit A, the relation between the abovementioned loads must be selected so as to satisfy the following equation.

$$\frac{Z}{R_a}=\sin \omega \tau$$

where $$Z=\frac{R\omega L}{\sqrt{R^2+\omega^2 L^2}}$$

On the assumption that the current of the secondary winding of the current transformer $T_2$ is I, the load voltage V is represented by the next equation.

$$\dot{V}=\dot{I}\dot{Z}=\frac{1}{\frac{1}{R}+\frac{1}{PL}}\dot{I}=\frac{PLR}{PL+R}\dot{I}$$

where P is a differential operator.

If the transient solution of the load voltage $\dot{V}$ is calculated on the assumption that $I=I_m(\epsilon^{-\alpha t}-\cos \omega t)$, said voltage can be represented by the following equation in connection with only the first term of the current I, said term being obtainable according to the expansion theorem.

$$V_1 = I_m \frac{PRL}{PL+R} \epsilon^{-\alpha t} = I_m \left[ \frac{-\alpha RL}{-\alpha L + R} \epsilon^{-\alpha t} + \frac{-\frac{R}{L}R}{-\frac{R}{L}(-\alpha)} \epsilon^{-\frac{R}{L}t} \right]$$

$$= I_m \left[ -\frac{\alpha RL}{R-\alpha L} \epsilon^{-\alpha t} + \frac{R^2}{R-\alpha L} \epsilon^{-\frac{R}{L}t} \right] \quad (1)$$

According to Equation 1, two terms, one having a time constant of direct current component of the current I and the other having a time constant determined by circuit constants, are obtained.

Similarly, the load voltage V can be represented by the following equation in connection with only the second term of the current I.

$$V_2 = I_m \frac{PLR}{PL+R}(-\epsilon^{j\omega t}) = -I_m \left[ \frac{j\omega RL}{j\omega L + R} \epsilon^{j\omega t} + \frac{-\frac{R}{L}R}{-\frac{R}{L}-j\omega} \epsilon^{-\frac{R}{L}t} \right]$$

(2)

If the equation ($\epsilon^{j\omega t} = \cos \omega t + j \sin \omega t$) is put in Equation 2, and only the real parts are taken out, the following Equation 3 is obtained.

$$V_2 = -I_m \left[ \frac{\omega LR}{\sqrt{R^2+\omega^2 L^2}} \cos(\omega t + \phi) + \frac{R^3}{R^2+\omega^2 L^2} \epsilon^{-\frac{R}{L}t} \right] \quad (3)$$

where $$\phi = \tan^{-1} \frac{R}{\omega L}$$

Since the load voltage V is equal to $(V_1+V_2)$, that is, $V = (V_1+V_2)$, the magnitudes of the alternating current component AC and direct current component DC are respectively represented by the following quantities.

$$AC = \frac{\omega LR}{\sqrt{R^2+\omega^2 L^2}} I_m$$

$$DC = DC_a + DC_b$$

$DC_a$ (time constant component of the current in the main circuit)

$$\frac{\alpha RL}{R-\alpha L} I_m$$

$DC_b$ (component due to constants of the load circuit)

$$\left( \frac{R^2}{R-\alpha L} - \frac{R^3}{R^2+\omega^2 L^2} \right) I_m$$

Ratio $\eta$ of $DC_a$ to AC is represented by the following Equation 4 on the assumption that $$T = \frac{L}{R}$$

$$\eta = \frac{\frac{\alpha RL}{R-\alpha L}}{\frac{\omega LR}{\sqrt{R^2+\omega^2 L^2}}} = \frac{\alpha \sqrt{R^2+\omega^2 L^2}}{\omega(R-\alpha L)} = \frac{\alpha}{\omega} \frac{\sqrt{1+\omega^2 T^2}}{1-\alpha T} \quad (4)$$

Since $\alpha$ is generally of the order of 20, and $\omega$ is equal to $(2\pi \times 50)$, if T is selected to be about 5 ms. (¼ cycle) with respect to 50 c./s. so that component $DC_b$ attenuates rapidly and this component can be disregarded, $\eta$ becomes equal to 0.131 ($\eta = 0.131$) in Equation 4, which is very small.

Ratio $\xi$ of $DC_b$ to I is represented by the following Equation 5.

$$\xi = \frac{\frac{R^2}{R-L\alpha} - \frac{R^3}{R^2+\omega^2 L^2}}{\frac{\omega LR}{\sqrt{R^2+\omega^2 L^2}}} = \frac{\left(\frac{\alpha}{\omega}+\omega T\right)}{(1-\alpha T)\sqrt{1+\omega^2 T^2}} = 0.98 \quad (5)$$

The value of $\xi$ is considerably large, but since attenuation of the component $DC_b$ is rapid (time constant $T = 5$ ms.), said component does not afford any considerable effect. This fact is shown in FIG. 2.

According to the present invention, as shown in FIG. 1, two kinds of alternating current voltages obtained as described above are rectified by all-wave rectifier circuits $S_e$, a direct current voltage $V_c$ in proportion to magnitude of the alternating current component of the main current in the main circuit is obtained by connecting a capacitor C in parallel to the output circuit of the rectifier circuit $S_e$ corresponding to the detecting load circuit Z, and said voltage $V_c$ and a terminal voltage $V_r$ of a resistor $r$ connected in parallel to the other rectifier circuit $S_e$ are supplied into a comparison circuit CC. When a device capable of producing a pulse at the instant when the terminal voltage $V_c$ of the capacitor C exceeds the terminal voltage $V_r$ of the resistor $r$ is utilized as the comparison circuit CC, said pulse becomes a breaking command.

In FIG. 3 are shown waveforms at various points of the circuit of FIG. 1. In the system of this invention, in the case in which a large direct current component is included in the main current of the main circuit, the peak value of the terminal voltage $V_r$ does not exceed the direct current bias voltage $V_c$ during the initial two or three cycles of the abnormal current in connection with negative half wave, so than no breaking command is produced. However, such a condition as described above in which no breaking command is produced is safer than the case in which breaking capability is stopped by incorrect operation. Accordingly, said condition is not unfavorable in practical use.

In FIG. 4 is shown an example to which the above-mentioned principle is applied, in which a device consisting of a saturable pulse transformer $P \cdot T_r$ and a diode D is utilized as the comparison circuit CC. In the embodiment of FIG. 4, when the terminal voltage $V_c$ of the capacitor C exceeds the terminal voltage $V_r$ of the resistor $r$, the diode D becomes conductive and the difference between said voltages $V_c$ and $V_r$ is applied to the pulse transformer $P \cdot T_r$, whereby a pulse is obtained from the output terminals $P_o$. Of course, the circuit of said voltages are short-circuited after saturation of the pulse transformer $P \cdot T_r$, but since said circuit is a part of the current transformer circuit, there is no unfavorable condition for the practical use. Furthermore, because of continuous taking-out of the pulse in only one direction, the pulse transformer $P \cdot T_r$ receives a bias magnetization due to input current in one direction. In order to avoid said unidirectional magnetization, a direct current bias $E_b$ of opposite direction is applied to the pulse transformer $P \cdot T_r$.

Figure 5:
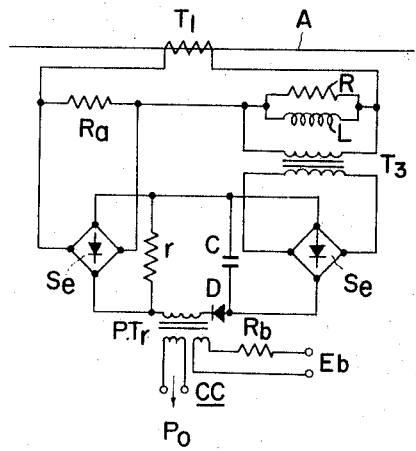

The example of FIG. 5 is almost the same as that of FIG. 4 except that, while in the latter example, two separate current transformers $T_1$ and $T_2$ are used for obtaining a voltage including a direct current component and a voltage corresponding to only the alternating current component in the example of FIG. 4, in the former example only one current transformer $T_1$ is used, two circuits including respectively load resistors $R_a$ and R are connected in series, and the output side of said load resistor R is electrically separated from the comparison circuit by means of an isolating transformer $T_3$. The example of FIG. 5 can attain the same operation as that of the example of FIG. 4. In the example of FIG. 5, an isolating transformer $T_3$ is connected in the circuit which produces only an alternating current component, but such a connection is not indispensable.

Figure 6:
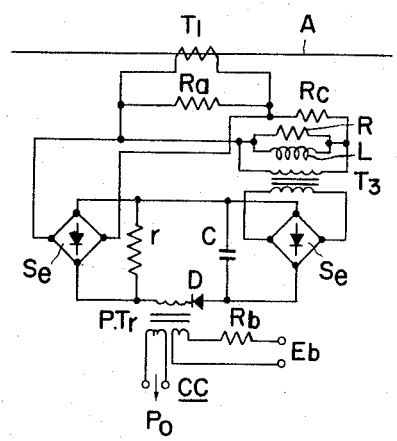

The example of FIG. 6 relates to a circuit obtained by improving the examples of FIGS. 4 and 5 so as to be more practical. In the example of FIG. 6, the load circuit of the current transformer $T_1$ consists of a circuit comprising a resistor $R_a$ and producing a component corresponding to an alternating voltage including a direct current component and a circuit comprising a resistor $R_c$ of a high resistance and producing a component corresponding to only the alternating current component. According to the arrangement shown in FIG. 6, the secondary load of the current transformer $T_1$ can be reduced with substantially the same operation and result as those of the examples of FIGS. 4 and 5.

According to test results, the operations of the examples of FIGS. 4 and 5 were entirely the same, and the operation of the example of FIG. 6 was substantially the same as those of the examples of FIGS. 4 and 5. Moreover, it was confirmed that the example of FIG. 6 is more economical because in this example the secondary load of the current transformer $P \cdot T_r$ was lower than ½ of those of the examples of FIGS. 4 and 5.

Figure 7:
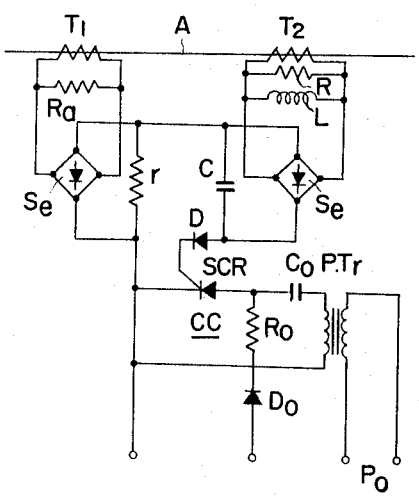

The example of FIG. 7 is almost the same as that of FIG. 4 except that in the former example the comparison circuit CC consists of a rectifier element SCR provided with a control electrode and a diode D adapted to limit the reverse current of said control electrode and back voltage within their rated values. In the example of FIG. 7, when the terminal voltage $V_c$ of the capacitor C exceeds the terminal voltage $V_r$ of the resistor $r$, the diode D and control electrode of the rectifier element SCR become conductive, whereby the charge of the capacitor $C_o$ connected in series with the anode of the rectifier element SCR is instantaneously discharged, so that a pulse is produced from the output terminal $P_o$ of the pulse transformer $P \cdot T_r$ which is connected in series to the rectifier element SCR and capacitor $C_o$. In FIG. 7, the circuit consisting of a diode $D_o$ and a resistor $R_o$ connected in parallel to the series circuit of the capacitor $C_o$ and the pulse transformer $P \cdot T_r$ is used to charge the capacitor $C_o$. In this case, the series circuit consisting of the resistor $R_o$ and diode $D_o$ is designed so that the current passing through said series circuit is restricted by said resistor $R_o$ at a value lower than the minimum holding current of the rectifier element SCR, and this rectifier element SCR is caused to be operated during only the period in which the control electrode of the rectifier element SCR is ignited. According to such a design as described above, since the switching of the rectifier element SCR is carried out at a period which is twice the frequency of the current of the main circuit, for the sake of attaining rapid charging of the capacitor $C_o$, an alternating current having a frequency considerably higher than that of the current of the main circuit should be used as the power to be applied to the diode $D_o$. However, the abovementioned circuit may be replaced by a circuit consisting of a pure direct current power source such as a battery and a resistor $R_o$ connected thereto in series. In this case also, the current must satisfy the abovementioned condition. As described above, when a circuit comprising the diode D and rectifier element SCR provided with a control electrode is used as the comparison circuit, since said rectifier element has no loss corresponding to any exciting current, the operation level is decreased, thus improving the detecting sensitivity. On the contrary, in the case of utilizing the diode D and pulse transformer $P \cdot T_r$, a loss corresponding to the exciting current of the pulse transformer $P \cdot T_r$ occurs, thus reducing the detecting sensitivity.

Figure 8:
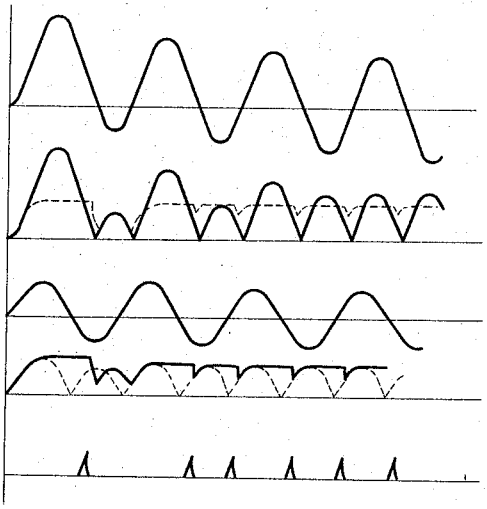

FIG. 8 shows waveforms at various points in the examples of FIGS. 4 to 7. As shown in FIG. 8, the rising part of the waveform of the output of the pulse transformer $P \cdot T_r$ assumes a slope due to the iron core of said transformer.

In the system of this invention, the voltage $V_r$ similar to the main current passing through the main circuit and a direct current bias voltage $V_c$ which is in proportion to the alternating component in said main current are introduced into an appropriate comparison circuit CC, and the cross point at the time when said voltage $V_o$ exceeds the said voltage $V_r$ is detected. For the sake of detecting the abovementioned cross point, a voltage or a current having a level necessary for operating the pulse transformer $P \cdot T_r$ or a level necessary for igniting the control electrode of the rectifier element SCR is required. Regarding this point, the comparison circuit, of whatever type it may be, requires a detecting level of the order corresponding to the detecting sensitivity of the detecting device, because said comparison circuit compares and detects both voltages $V_c$ and $V_r$.

Figures 9A, 9B, 9C:
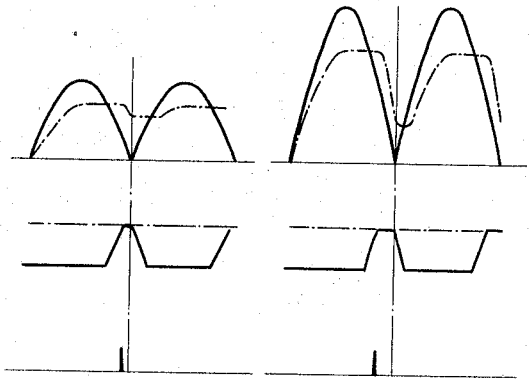

In FIGS. 9(A), 9(B) and 9(C) are successively shown voltage waveforms of the voltage $V_r$ similar to the main current passing through the main circuit, a direct current bias voltage $V_c$, and difference voltage $(V_c - V_r)$. The detecting level in FIG. 9(A) corresponds to the level which when the difference voltage $(V_c - V_r)$ reaches said detecting level the pulse transformer $P \cdot T_r$ or the rectifier element SCR can produce a signal. However, when the load of the main circuit is extremely low and the current of the main circuit is very small, the difference voltage $(V_c - V_r)$ cannot reach said level, so that the waveform of said difference voltage $(V_c - V_r)$ becomes almost a triangular wave the apex of which corresponds to zero point. However, since when said difference voltage does not reach the detecting level, an output pulse does not appear, detection of a signal produced before a predetermined time interval relative to a zero point becomes impossible. On the contrary, as shown in FIGS. 9(B) and 9(C), with increase of the current passing through the main circuit, the operating point, that is, the pulse generating point of the pulse transformer $P \cdot T_r$ or rectifier element SCR, approaches the cross point between the bias voltage $V_c$ and the voltage $V_r$. This relation is represented by the characteristic curve $(a)$ in FIG. 11.

FIG. 11 shows the characteristic of the detecting time prior to a zero point for the secondary current of the current transformer in the various examples of this invention. As mentioned above, for the purpose of opening completely the contact of the breaker at a zero point of the current, the breaking instruction must be imparted at a predetermined time instant prior to a zero point of the current, but said time instant is different according to the performance of the breaker.

FIG. 11 is drawn in connection with the case wherein this invention is applied on a circuit breaker in which the period of time between said predetermined time and zero point, for example, is about 2.5 ms.

Further, said detecting time prior to a zero point must be fixed without relation to the value of the main circuit current, but as mentioned in the explanation for FIGS. 9(A), 9(B) and 9(C), the detecting time instant prior to a zero point is different according to magnitude (large or small) of the main circuit current. As will be apparent from the curve $(a)$, during the range in which the current passing through the main circuit is relatively low, circuit breaking cannot be completed until the zero point of said current because the detecting time prior to said zero point is too short, thus causing continuation of the arc until the next zero point. Of course, in this case also, circuit breaking can be completed because the current passing through the main circuit is relatively small, but synchronous breaking cannot be effectively attained.

In order to improve the detecting sensitivity at the time of detection of the cross point of the voltage $V_r$ similar to the current passing through the main circuit and the bias voltage $V_c$, the following methods (1) and (2) may be considered. (1) The proportionality constant of the direct current bias voltage $V_c$ in proportion to the magnitude of the alternating component contained in the current of the main circuit is automatically varied by its own alternating current so as to compensate for insufficiency of the detecting sensitivity. (2) The direct current bias voltage $V_c$ is compared with a voltage obtained by subtracting always a relatively small predetermined voltage from the voltage $V_r$ similar to the current passing through the main circuit.

The above methods (1) and (2) can be embodied as illustrated in the example of FIG. 10. In this example, the parallel circuit consisting of a resistor R and an inductor L and taking out only the alternating component in the current passing through the main circuit is somewhat modified so that a diode circuit $D_3$ comprising two semiconductor diodes $D_{31}$ and $D_{32}$ which are inversely connected in parallel to each other and a resistor $R_1$ are connected in parallel, and the normally inserted resistor R is connected in series to the circuit consisting of said diode circuit $D_3$ and resistor $R_1$, whereby the abovementioned method (1) can be embodied. When the current passing through the main circuit is small, and the terminal voltage of the resistor $R_1$ is lower than the threshold voltage of the semiconductor diode $D_{31}$ or $D_{32}$ assuming that a forward voltage is applied to the diode $D_{31}$, the forward resistance of the diode is thought to be extremely large, and the backward resistance of the diode $D_{32}$ is essentially large, so the current passes substantially through the resistor $R_1$, whereby the alternating voltage which is in proportion to the alternating current component contained in the current passing through the main circuit becomes equal to the terminal voltage of the resistors R and $R_1$ and is higher by the terminal voltage of the resistor $R_1$ than that in the case where only the resistor R is utilized.

The aforementioned fact is true in the case also in which the normal directional voltage is applied to the diode $D_{32}$. consequently, the direct current bias voltage $V_c$ becomes large, and the difference voltage $(V_r-V_c)$ becomes large, thus causing said difference voltage to reach rapidly the detecting level. On the contrary, when a voltage larger than the threshold voltage of the diode $D_{31}$ (or $D_{32}$) is applied to both terminals of the resistor $R_1$, the diode $D_{31}$ (or $D_{32}$) becomes conductive, whereby the alternating voltage in proportion to the alternating current component contained in the current passing through the main circuit is caused to be equal to the sum of the terminal voltage of the resistor R and the threshold voltage of the diode $D_{31}$ (or $D_{32}$). Said threshold voltage of the diode has no relation to the current through itself. Consequently, the rate of increase of the voltage is subtsantially equal to that in the case where only the normal resistor R is utilized even when the current of the main circuit is increased, so that the time required for reaching the detecting level can be limited, without being made to be extremely rapid, within the maximum detecting period of time which has been previously designed. Accordingly, there is no possibility of the circuit breaker being opened before a zero point of the current passing through the main circuit. This relationship is indicated by curve (b) in FIG. 11.

The aforementioned method (2) is embodied in the example of FIG. 10 in the following manner. Semiconductor diodes $D_2$ are inserted between the rectifier circuit $S_e$ on the side producing a direct current voltage similar to the current passing through the main circuit and the resistor r connected to the output side of said rectifier circuit $S_e$ in such a manner that the polarity of said diodes $D_2$ coincides with that of said rectifier circuit $S_e$, a voltage $V_{ra}$ obtained by subtracting the threshold voltage of the diodes $D_2$ from the voltage $V_r$ similar to the current passing through the main circuit is obtained, and a difference voltage $(V_c-V_{ra})$ is supplied to the comparison circuit CC, whereby an output pulse is obtained. According to this arrangement, since the initial point of the difference voltage $(V_c-V_{ra})$ leads the initial point of the difference voltage $(V_c-V_r)$ which is obtained in the case in which the diodes $D_2$ are not used, an output pulse $P_a$ faster than the output pulse P can be obtained. In this relationship is represented by the relation between the magnitude of the main current and the detecting time prior to zero point, said relation can be represented by characteristic curve (c) of FIG. 11. By comparing the curve (a) with the curve (c), it will be observed that the detecting character within a small current range is remarkably improved in the case of the curve (c).

In FIG. 10, diodes $D_2$ consists of 2 diodes, but the number of the diodes can be determined according to the necessary subtracting voltage (or voltage to be subtracted).

While the abovementioned methods (1) and (2) have been described for the cases where they are used independently, they can be utilized also in combination as illustrated.

As described above, according to the present invention, a signal advanced by a predetermined time interval relative to a zero point can be accurately detected, so that a synchronous circuit breaker capable of being broken at a zero point of the current to be broken can be embodied by combining said signal detecting apparatus with a circuit breaker. Furthermore, since the charge of a capacitor used in the circuit producing only an alternating component is charged and discharged every half cycle, regular operation can be obtained irrespective of circuit breaking after high speed reclosing, sudden variation of the current, and the like.

What we claim is:

1. An apparatus for detecting a signal advanced by a predetermined time interval relative to a zero point of a main circuit current having an alternating current component, comprising circuit means for producing a direct current voltage which is in proportion to the magnitude of substantially only the alternating current component of said main circuit current, circuit means for producing a non-smoothing full wave rectified voltage which is in proportion to the instantaneous value of said main circuit current, and comparison means for comparing said direct current voltage and said non-smoothing full wave rectified voltage to produce a detecting signal whenever said former voltage exceeds said latter voltage in every half cycle of said circuit current.

2. An apparatus for detecting a signal advanced by a predetermined time interval relative to a zero point of a main circuit current having an alternating current component, comprising circuit means for producing a direct current voltage which is in proportion to the magnitude of substantially only the alternating current component of said main circuit current, circuit means for producing a non-smoothing full wave rectified voltage which is in proportion to the instantaneous value of said main circuit current, and comparison means consisting of a series circuit of a diode and a pulse transformer, said circuit being applied with a difference voltage between said direct current voltage and said non-smoothing full wave rectified voltage to produce a detecting signal whenever said former voltage exceeds said latter voltage in every half cycle of said circuit current.

3. An apparatus for detecting a signal advanced by a predetermined time interval relative to a zero point of a main circuit current having an alternating current component, comprising means for producing a direct current voltage which is in proportion to the magnitude of substantially only the alternating current component of the main circuit current, circuit means for producing a non-smoothing full wave rectified voltage which is in proportion to the instantaneous value of said main circuit current, and comparison means consisting of a rectifier element provided with a control electrode and a diode connected to said control electrode, said control electrode of said rectifier element being applied with a difference voltage between said direct current voltage and said non-smoothing full wave rectified voltage as a control signal through said diode to produce a detecting signal whenever said former voltage exceeds said latter voltage in every half cycle of said circuit current.

4. An apparatus for detecting a signal advanced by a predetermined time interval relative to a zero point of a main circuit current having an alternating current component, comprising circuit means for producing a direct current voltage which is in proportion to the magnitude of substantially only the alternating current component of the main circuit current, said circuit means comprising a first current transformer connected at its primary side to said main circuit, a parallel circuit consisting of a resistor and an inductor and connected in parallel to the secondary side of said first current transformer, and a rectifying circuit adapted to full-wave rectify the voltage of said parallel circuit and provided with a capacitor connected with output terminals of said circuit to produce a direct current output voltage, circuit means for producing a non-smoothing full wave rectified voltage which is in proportion to the instantaneous value of said main circuit current, said circuit means comprising a second current transformer connected at its primary side to said main circuit, a resistor which is connected in parallel with the secondary side of said second current transformer to produce a voltage proportional to the instantaneous value of said main circuit current, and comprising a further rectifying circuit for full-wave rectifying the voltage of said resistor, said further rectifying circuit being provided at its output terminals with a resistor to obtain a non-smoothing full-wave rectified voltage and comparison means for comparing said direct current voltage and said non-smoothing full-wave rectified voltage to produce a detecting signal whenever said former voltage exceeds said latter voltage in every half cycle of said main circuit current.

5. An apparatus for detecting a signal advanced by a predetermined time interval relative to a zero point of a main circuit current having an alternating current component comprising a main circuit, a current transformer connected at its primary side to said main circuit, an impedance circuit comprising a first resistor and an impedance which is connected in series to said first resistor and consists of a second resistor and an inductor which are connected in parallel to each other, said impedance circuit being connected in series to the secondary side of said transformer, circuit means for producing a non-smoothing full-wave rectified voltage which is in proportion to the instantaneous value of said main circuit current, said circuit means comprising a rectifying circuit adapted to full-wave rectify the voltage at said first resistor and provided at its output terminals with a third resistor to produce a non-smoothing full-wave rectified voltage, further circuit means for producing a direct current voltage which is in proportion to the magnitude of substantially only the alternating current component of said main circuit current, said further circuit means comprising a rectifying circuit adapted to full-wave rectify the voltage of said impedance and provided at its output terminals with a capacitor to produce a direct current output voltage, and comparison means for comparing said direct current voltage and said non-smoothing full-wave rectified voltage to produce a detecting signal whenever said former voltage exceeds said latter voltage in every half cycle of said main circuit current.

6. An apparatus for detecting a signal advanced by a predetermined time interval relative to a zero point of a main circuit current having an alternating current component, comprising a main circuit, a current transformer connected at its primary side to said main circuit, a first resistor connected in parallel to the secondary side of said current transformer, circuit means for producing a non-smoothing full-wave rectified voltage which is in proportion to the instantaneous value of said main circuit current, said circuit means comprising a rectifying circuit adapted to full-wave rectify the voltage at said first resistor and provided at its output terminals with a third resistor to produce a non-smoothing full-wave rectified voltage, further circuit means for producing a direct current voltage which is in proportion to the magnitude of substantially only the alternating current component of said main circuit current, said further circuit means comprising an impedance circuit connected in parallel to said first resistor and consisting of a second resistor and an impedance which are connected in series, said impedance consisting of a fourth resistor and an inductor which are connected in parallel to each other, and a rectifying circuit adapted to full-wave rectify the voltage of said impedance and provided at its output terminals with a capacitor to produce a direct current output voltage, and comparison means for comparing said direct current voltage and said non-smoothing full-wave rectified voltage to produce a detecting signal whenever said former voltage exceeds said latter voltage in every half cycle of said main circuit current.

7. An apparatus for detecting a signal advanced by a predetermined time interval relative to a zero point of a main circuit current having an alternating current component, comprising circuit means for producing a direct current voltage which is in proportion to the magnitude of substantially only the alternating current component of said main circuit current, said circuit means including means for varying automatically the proportionality constant of said direct current voltage in response to the magnitude of said alternating current component to increase said proportionality constant when the current passing through the main circuit is relatively low, further circuit means for producing a non-smoothing full-wave rectified voltage which is in proportion to the instantaneous value of said main circuit current, and comparison means for comparing said direct voltage and said non-smoothing full-wave rectified voltage to produce a detecting signal whenever said former voltage exceeds said latter voltage in every half cycle of said main circuit current.

8. An apparatus for detecting a signal advanced by a predetermined time interval relative to a zero point of a main circuit current having an alternating current component, comprising means for producing a direct current voltage which is in proportion to the magnitude of substantially only the alternating current component of said main circuit current, means for producing a non-smoothing full-wave rectified voltage which is in proportion to the instantaneous value of said main circuit current, said circuit means including means for subtracting a relatively low constant voltage from said non-smoothing full-wave rectified voltage, and comparison means for comparing said direct current voltage and a difference voltage between said non-smoothing full-wave rectified voltage and said relatively low constant voltage to produce a detecting signal whenever said direct voltage exceeds said difference voltage in every half cycle of said main circuit current.

9. An apparatus for detecting a signal advanced by a predetermined time interval relative to a zero point of a main circuit current having an alternating current component, comprising a main circuit, circuit means for producing a direct current voltage which is in proportion to the magnitude of substantially only the alternating current component of said main circuit current, said circuit means including means for varying automatically the proportionality constant of said direct current voltage in response to the magnitude of said alternating current component to increase said proportionality constant when the current passing through the main circuit is relatively low, further circuit means for producing a non-smoothing full-wave rectified voltage which is in proportion to the instantaneous value of said main circuit current, said last mentioned circuit means including means for subtracting a relatively low constant voltage from said non-smoothing full-wave rectified voltage, and comparison means for comparing said direct current voltage and a difference voltage between said non-smoothing full-wave rectified voltage and said relatively low constant voltage to produce a detecting signal whenever said direct voltage exceeds said difference voltage in every half cycle of said main circuit current.

References Cited by the Examiner
UNITED STATES PATENTS

| | | | |
|---|---|---|---|
| 2,920,242 | 1/1960 | Koss | 317—36 |
| 3,201,604 | 8/1965 | Schwanenflugel | 328—150 X |

ARTHUR GAUSS, *Primary Examiner.*

J. ZAZWO, *Examiner.*

J. ZAZWORSKY, *Assistant Examiner.*